United States Patent [19]

Sheikh

[11] Patent Number: 4,840,731
[45] Date of Patent: Jun. 20, 1989

[54] APPARAUS FOR REDUCTION OF COD IN WATER

[76] Inventor: Morris Sheikh, 803 Canterberry Crescent, Bloomfield Hills, Mich. 48013

[21] Appl. No.: 76,312

[22] Filed: Jul. 22, 1987

Related U.S. Application Data

[62] Division of Ser. No. 746,041, Jun. 18, 1985, Pat. No. 4,683,065.

[51] Int. Cl.$^4$ .............. C02F 1/74; B01J 8/04
[52] U.S. Cl. .................... 210/200; 210/205; 210/251; 210/253; 210/264; 210/269; 210/284; 422/190; 422/213; 422/223
[58] Field of Search ............. 210/762, 763, 150, 151, 210/188, 199–201, 205, 206, 218, 251, 253, 264, 269, 275, 277, 283, 284, 289, 291, 292; 422/184, 190, 211, 213, 216, 220, 223

[56] References Cited

U.S. PATENT DOCUMENTS

| | | | |
|---|---|---|---|
| 2,029,958 | 2/1936 | Urbain et al. | 210/2 |
| 2,601,221 | 6/1952 | Rosenblatt et al. | 252/374 |
| 2,665,249 | 1/1954 | Zimmermann | 210/2 |
| 2,690,425 | 9/1954 | Moses et al. | 210/2 |
| 2,944,396 | 7/1960 | Barton et al. | 60/39.05 |
| 3,029,201 | 4/1962 | Brown et al. | 210/59 |
| 3,029,202 | 4/1962 | Brown et al. | 210/63 |
| 3,054,653 | 9/1962 | Barton et al. | 210/762 X |
| 3,133,016 | 5/1964 | Stine et al. | 210/3 |
| 3,226,320 | 12/1965 | Menly | 210/763 X |
| 3,467,491 | 9/1969 | Hardison | 23/2 |
| 3,487,016 | 12/1969 | Zeff | 210/763 X |
| 3,557,238 | 1/1971 | Cunningham | 252/415 X |
| 3,804,756 | 4/1974 | Callahan et al. | 210/762 X |
| 3,817,862 | 6/1974 | Hoke | 210/763 X |
| 3,819,516 | 6/1974 | Murchison et al. | 210/763 X |
| 3,823,038 | 7/1974 | Box, Jr. et al. | 210/762 |
| 3,888,633 | 6/1975 | Grosboll et al. | 210/287 X |
| 3,901,660 | 8/1975 | Ohonodnik et al. | 210/188 X |
| 3,912,626 | 10/1975 | Ely et al. | 210/762 X |
| 3,988,259 | 10/1976 | Ray | 210/762 X |
| 4,007,118 | 2/1977 | Ciambrone | 210/760 |
| 4,029,578 | 6/1977 | Turk | 210/763 X |
| 4,049,545 | 9/1977 | Horvath | 210/199 X |
| 4,070,281 | 1/1978 | Tagashira et al. | 210/762 X |
| 4,072,608 | 2/1978 | Farha, Jr. et al. | 210/762 X |
| 4,110,081 | 8/1978 | Miller et al. | 210/269 X |
| 4,115,264 | 9/1978 | McCarthy et al. | 210/762 X |
| 4,141,828 | 2/1979 | Okada et al. | 210/762 |
| 4,160,806 | 7/1979 | Long et al. | 422/223 |
| 4,218,315 | 8/1980 | Hartkorn | 210/761 X |
| 4,246,104 | 1/1981 | Schmiot et al. | 210/763 X |
| 4,294,703 | 10/1981 | Wilms et al. | 210/763 X |
| 4,294,706 | 10/1981 | Kakihara et al. | 210/762 |
| 4,378,292 | 3/1983 | Haase et al. | 210/284 X |
| 4,383,983 | 5/1983 | Urban | 210/763 X |
| 4,560,536 | 12/1985 | Tabak | 422/190 X |
| 4,604,215 | 8/1986 | McCorguodale | 210/762 |
| 4,683,062 | 7/1987 | Krovak et al. | 210/150 X |

FOREIGN PATENT DOCUMENTS 53-113168 10/1978 Japan.
54-127150 10/1979 Japan.
59-222294 12/1984 Japan.

Primary Examiner—Tom Wyse
Attorney, Agent, or Firm—Basile and Hanlon

[57] ABSTRACT

A method and apparatus for reducing chemical oxygen demand levels in water which includes the steps of:

(a) mixing the water to be treated with at least one oxygen source;
(b) contacting the water with a first, activated alumina catalyst;
(c) contacting the water with a catalyst selected from the group consisting of Group VIIIB metals, Group IB metals, or mixtures thereof;
(d) reacting chemical contaminants in the water with the oxgen source; and finally
(e) contacting the water with an adsorptive material such as activated carbon.

The present invention also includes a method and apparatus for regenerating the catalyst in situ by contacting the catalyst with alkaline and acidic aqueous inorganic regeneration solutions.

21 Claims, 2 Drawing Sheets

APPARAUS FOR REDUCTION OF COD IN WATER

This application is a divisional of Ser. No. 746,041, June 18, 1985, now U.S. Pat. No. 4,683,065.

BACKGROUND OF THE INVENTION

1. Field of the Invention

The present invention relates to a process and apparatus for reducing chemical oxygen demand (COD) in water. More particularly, the present invention relates to a process and apparatus whereby polluted water is successively treated to remove organic and inorganic pollutants. Even more particularly, the present invention provides a process and apparatus therefor for treating polluted water utilizing both flocculation and catalytic oxidation.

II. Description of the Prior Art

As a result of growing concern for the purity of water resources and in response to growing governmental pressures to maintain the quality of these water resources, industry and other large-scale water consumers have been required to investigate and implement methods for reducing chemical pollutants contained in their effluent streams. The danger of chemical pollution in water is due, in part, to the ability of organic constituents to bind dissolved oxygen contained in the water. This binding, whether by chemical reaction or simple chemical interaction, prevents the utilization of dissolved oxygen by aquatic life. The effect of this binding is commonly referred to as chemical oxygen demand (COD).

Because of the importance of maintaining adequate levels of dissolved osygen in water streams, various governmental agencies, such as the U.S. Environmental Protection Agency, have set forth guidelines and test procedures for measuring the COD of effluent streams entering rivers and lakes. Industrial, municipal and other large scale users of water are required by law to maintain COD of effluent streams originating at their facilities at or below mandated levels or face legal penalties.

As the amount of discharged pollutants has risen with increases in population and industrialization, various processes have been implemented to improve the quality of the water discharged, as effluent, as established by the mandated standards. Most of these methods involve waste water treatment to eliminate pollutants in the effluent streams, prior to discharge into sewers. Among the method proposed are (1) evaporation followed by incineration, (2) chemical treatment to render the organic constituents in the effluent harmless, (3) biological treatment and aeration of effluent collected in holding tanks and (4) oxidation of the chemical constituents under restrictive conditions. Each of these methods has drawbacks as outlined below.

The first method, evaporation followed by incineration, is impractical where large volumes of water containing minute percentages of organic pollutants are involved. The procedure is extremely slow and imposes exorbitant expenditures in both manpower time and dollars.

Chemical treatment, such as chlorination, ozonation, treatment with hydrogen peroxide, etc., can be dangerous and expensive and is effective only on specific chemical pollutants. Thus, chemical treatment is not a general solution to the entire waste disposal problem. Furthermore, such treatment generally depends upon accurate analysis of the materials present in the waste effluent to ascertain what procedures are required to initiate predetermined chemical reactions to produce desired reaction products. Where such treatment is feasible, it generally results in focusing attention on by-product recovery rather than on the water disposal problem itself. The resulting waste effluent frequently contains different, but equally harmful pollutants after treatment; in some cases, these resulting pollutants are more dangerous than the initial ones. As a practical matter, in order to be effective, any chemical treatment method employed requires testing by expensive processes to ascertain the precise nature of the contaminants.

One of the major types of purification of organically polluted waste effluent involves the use of biological processes. The biological processes use microorganisms, such as bacteria or protozoa, to decompose chemical pollutants. In the biological system, industrial waste water first receives conventional primary treatment after which it is retained for a number of hours in large aeration tanks containing microorganisms. During this process, air is constantly diffused through the contained water, to support the microorganisms, as they use available carbon in the organic matter as a source of food, thereby metabolizing the compounds contained in the water to carbon, hydrogen and water, simultaneously rendering these compounds harmless.

Biological processes are limited by the nature of the microorganisms themselves. Great care must be exercised to maintain an environment in which the microorganisms will function. The temperature of the waste water must be carefully regulated to prevent adverse effects at the range where the microorganisms are active. The waste water must be supplemented with appropriate nutrients and other additives which allow the microorganisms to function at the desired level of efficiency. Likewise, care must be taken that the waste water contains no bactericidal or bacteriostatic compounds, e.g. formaldehyde and hexachlorophene, which will cause bacterial activity to cease. Furthermore, specific strains of microorganisms are specifically suited only for the decomposition of specific chemicals. Thus, an industry employing a biological process must be able to provide a system which combines specific strains of microorganisms specifically developed to decompose the various organic pollutants present in that industry's effluent streams. This requirement renders biological systems impractical and exigent. New or different organic constituents which enter the waste water being processed must lend themselves to the desired effect of the existing microorganisms, or the existing biological treatment system must be modified to accommodate the change in the compounds introduced into the system. This requirement is unreliable, costly and demands considerable maintenance time.

Even at peak performance, the biological system present several drawbacks. The microorganisms have a short life span. The system must be constantly seeded with new microorganisms in order to assure proper function of the system. The microorganisms reproduce and die constantly, placing an additional demand on the system, which will eventually cause the entire biological system to fail if the dead microorganisms are not removed. The removed organic mass presents a serious solid disposal problem. The microorganisms form a bulky, malodorous, gelatinous mass. Disposal routinely involves costly shipment from the location of the water treatment facility to disposal facilities where the organic mass is incinerated or buried in environmentally safe landfills.

While the biological system does provide biodegradation causing reduction in the COD of waste water, it is time-consuming, unpredictable and, in many cases, only marginally efficient. Because of these drawbacks, interest has been directed to other processes which would reduce COD without requiring microorganisms or potentially harmful chemical reactions. Most prominent among these is oxidative treatment.

The basic process for oxidative treatment is set forth in U.S. Pat. No. 2,665,249 to Zimmerman and U.S. Pat. No. 3,133,016 to Stine. Both Stine and Zimmerman teach the reduction of the total pollutant content of waste water by reacting the organic-containing water with oxygen at an elevated temperature. The Zimmerman process requires a reaction temperature of at least 450° F. to assure decomposition of the organic constituents. Stine teaches the use of superatmospheric pressures and temperatures ranging from 200° to 600° F. However, neither process provides for variances in the levels of organic pollutants present in the water. Thus, the treatment plant operator has no effective method for controlling the quality of the purified water. Also, neither process addresses the problem that many of the pollutants present in effluent streams are not readily oxidizable in their native state, such as short-chain organic compounds which are solubilized by long-chain constituents. Thus, while the Zimmerman process may result in a reduction of the overall COD in the effluent stream, many toxic components can remain in the treated water and eventually be dispensed into lakes, waterways and streams.

Processes employing various catalysts have been proposed for the oxidative decomposition of organic components contained in waste water. Examples of such processes are those found in U.S. Pat. Nos. 3,804,756 to Callahan; 3,823,088 to Box, Jr. and 2,690,425 to Moses. Each of the processes disclosed requires elevated temperatures to maintain the reaction process to completion. Catalysts such as platinum, palladium, zinc, copper and other components can be used to lower the ignition or decomposition energy of the entrained organics. Ideally, in each process the energy released, as heat, upon the decomposition of certain entrained organic components is used to initiate further breakdown. However, in actual operation, external energy must continually be added to the system to continue breakdown. Thus, with certain compounds, temperatures as high as 1000° F. may be required to initiate any appreciable breakdown of the entrained organic. Such temperatures require that the purification apparatus include high-pressure equipment and extensive supplemental heat transfer systems, since steam does not provide an effective means of transporting insoluble and soluble non-combustible salts and ash away from the reaction zone. Thus, systems, such as are disclosed in U.S. Pat. Nos. 2,944,396 to Burton; 4,294,706 to Kakihara and 4,141,828 to Okada, employ elevated pressures to maintain a portion of the waste stream in the aqueous phase to prevent build-up of residue in the reaction zone.

The above-discussed catalytic oxidation systems are concerned with haphazard decomposition of COD as a function of the total deleterious chemical constituents contained in water. A reduction in the COD level can occur when any of the chemical constituents are decomposed. It has been found that some water-soluble chemicals contained in waste water act as a solubilizing agent for normally insoluble constituents to the extent that the normally insoluble components cannot be removed by flocculation. The processes for COD reduction known in the prior art do not provide a systematic method for total breakdown of all chemical constituents together with a decrease in the associated COD, without employing elevated temperature and pressure. Thus, if the chemical contents of waste water can be systematically eliminated, the system can be more effective, more reliable and less expensive.

Furthermore, the methods for reducing COD in water previously developed do not provide an apparatus for effecting water purification catalytically in which the catalyst in one reactor can be regenerated while the purification process continues uninterrupted in others.

Thus, it would be desirable to provide a process for reducing chemical oxygen demand in waste water to levels at or below those mandated by the federal government.

It is also desirable that the process be carried out at ambient temperature and pressure.

It is also desirable that the process yield no undesirable by-products.

It would be desirable to provide a means for protecting any solid catalysts required for the process from excessive contamination.

It would also be desirable to provide a process for reducing COD in water in which the catalyst(s) and adsorptive material are present in a plurality of fixed beds and which can be regenerated in situ.

It is also desirable that the process include a means of isolating and regenerating individual reactors containing catalyst while the system remains in operation.

SUMMARY OF THE INVENTION

There is disclosed a novel process and apparatus for reducing and eliminating COD in water involving systematic decomposition of chemical compounds present in process waste water by the reaction of the chemical compounds with excess oxygen.

In the process of the present invention, process waste water which has been subjected to conventional primary flocculation treatment to remove emulsified oils and other organics is contacted with a plurality of catalysts arranged in a fixed bed. The catalyst can be either activated alumina or an appropriate metal which will catalyze the reaction of oxygen and the chemical contaminants entrained in the process waste water. In this manner, large concentrations of organic chemicals which remain water-bound, such as glycols, surfactants, amines, starches, sugars, complex food by-products and the like can be decomposed. Prior to contacting the catalyst, the water is mixed with compressed air or other appropriate oxygen sources to ensure that oxygen is present, in at least stoichiometric concentrations, for each successive catalytic reaction. The catalytic reaction reduces the complex organic compounds, eventually, to carbon dioxide and water. After the chemical contaminants have reacted with oxygen, the water is contacted with an adsorptive material to eliminate any remaining chemical contaminants.

The present invention provides sequential reaction series in which chemically polluted water is reacted with oxygen in the presence of activated alumina, then, an appropriate metal catalyst followed by adsorption on beds of an adsorptive material, such as activated carbon.

The water treated by the process of the present invention has COD levels well below the maximum COD level of 600 mg/L currently mandated by the United States Environmental Protection Agency. The present method and apparatus permits elimination of chemical pollutants such that reduction in COD to levels at or approaching zero is attainable.

Treated water can be directed to a discharge point or recycled through industrial processes. Alternately, if required, the water can be further treated to remove remaining metals, etc.

Also, the present invention provides a process for regenerating the catalyst to maintain optimum catalytic activity comprising the steps of contacting the catalyst with an alkaline inorganic solution, contacting the catalyst with an acidic inorganic solution and, optionally, thereafter, washing the catalyst with water.

The COD reduction apparatus of the present invention comprises at least one, and, preferably, a plurality of catalytic reactors which compressively hold the contained catalyst in place, suitable holding tanks to contain process waste water and various chemical solutions, and continuous pipelines connected to the catalytic reactors and holding tanks having various pumps and valves to convey the waste water and various chemicals and solutions. Also included in the present invention are means for introducing an oxygen-donating source connected to the waste water stream. Where a plurality of reactors are used, the reactors are arranged in fluid connection with each other such that the waste water passes through each reactor from bottom to top in a sequential order. Therefore, also present in the apparatus are suitable means for conveying the water from one reactor to the next.

The apparatus of the present invention also includes means for holding and conveying regeneration fluids to any given reactor as well as means for isolating any one reactor or combination of reactors from the process waste water stream. The means for isolating permits regeneration of the catalytic bed in any one reactor, at any given time, while the system remains operative.

BRIEF DESCRIPTION OF THE DRAWINGS

In the drawing, like reference numbers refer to like parts throughout the several views and wherein.

DESCRIPTION OF THE PREFERRED EMBODIMENT

As hereinabove noted, the present invention provides a method and apparatus for reducing COD in process waste water to levels at or below 600 mg/L and a method and apparatus for ensuring the continued optimum activity of the catalyst without interrupting water purification. The invention can be adapted to be used in conjunction with either conventional batch or continuous flow water treatment processes and can be operated efficiently at standard temperature and pressure. Set forth below are detailed descriptions of the process and apparatus of the present invention.

APPARATUS

Figure 1:
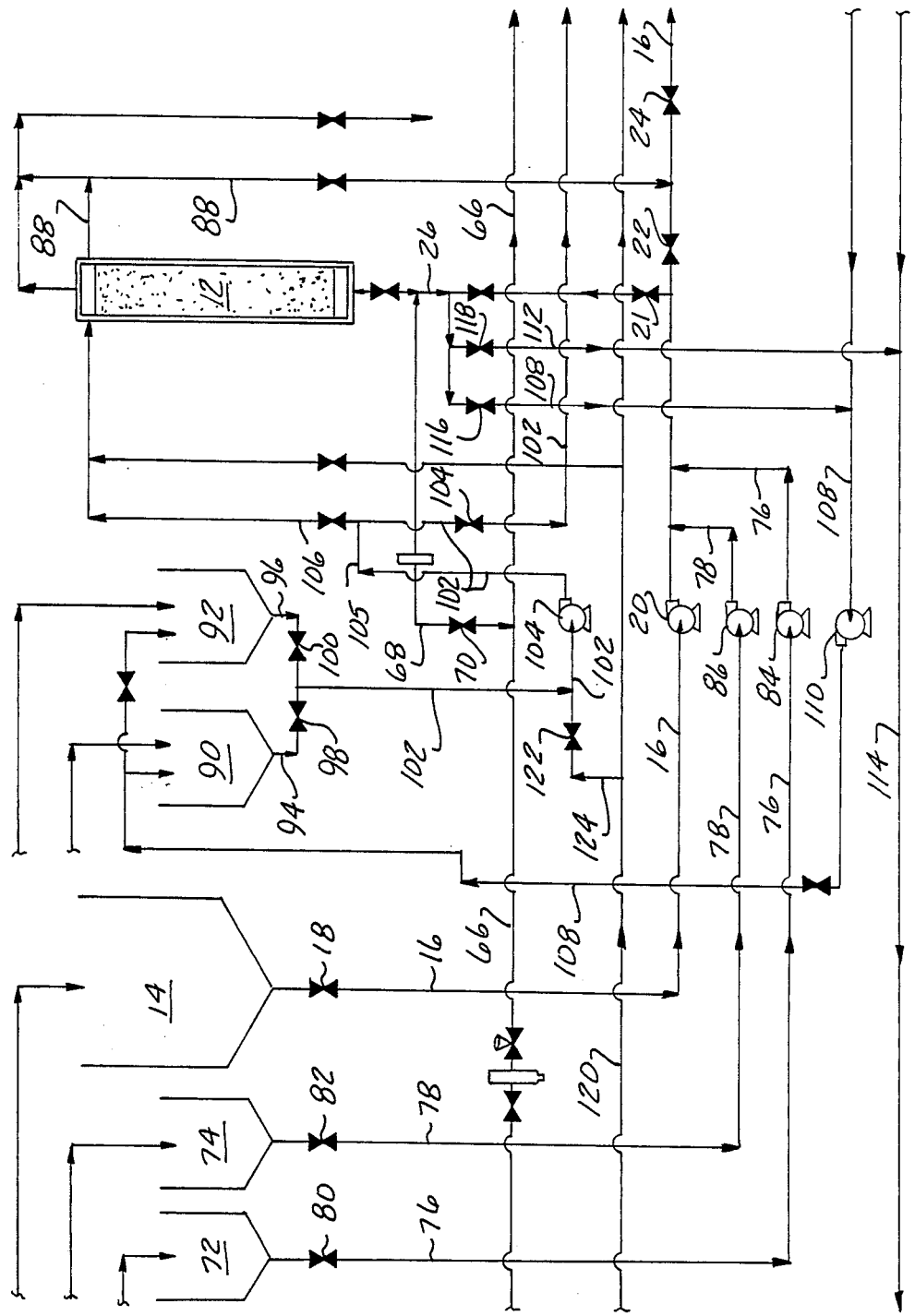
FIG. 1 is a process diagram of the COD reduction device of the present invention.

The apparatus 10 of the present invention is shown in schematic view in FIG. 1. The apparatus of the present invention generally comprises at least one reactor 12 containing a catalyst material under compression, means for conveying water, generally indicated at 16, to the reactor 12 such as pipes or conduits, having associated pumps, metering devices and the like, and a discharge (not shown).

In order to ensure a steady supply of water to be treated, the apparatus includes at least one waste water holding tank 14. The holding tank 14 is a reservoir of any desired configuration having an inlet (not shown) and a means for permitting water to exit the tank (not shown).

The waste water holding tank 14 is connected to each reactor 12 by a mainstream pipe 16. Located in the mainstream pipe 16 proximate the holding tank 14 is a valve 18 for controlling the flow of water from the holding tank 14. Mainstream pipe 16 may have at least one pump 20 to convey water through the apparatus. Also located in mainstream pipe 16 is a series of valves 22, 24 which can be opened and closed to divert water away from any given reactor 12.

It is to be understood that the apparatus of the present invention may have one or any number of reactors 12 and associated diverter valves 22, 24. Ordinarily, two or more reactors 12 are desirable. A plurality of reactors 12 permits catalyst regeneration (a process which will be discussed in greater detail later) to be carried out in one reactor while the COD reduction process of the present invention occurs in the remaining reactors. In the preferred embodiment, twelve reactors 12 are each connected to mainstream pipe 16 by a mainstream connector line 26 to permit water conveyed from the holding tank 14 to pass sequentially through any combination of reactors 12. Each mainstream connector line 26 has a valve 28 which can be closed to isolate the associated reactor from the mainstream pipe 16 for catalyst regeneration.

It is to be noted that each reactor 12 has identical piping and valving. Thus, reference to associated structures of one reactor 12 and its associated piping are repeated with respect to all subsequent reactors 12.

The apparatus 10 has a plurality of air feed lines 66 which provide a source of oxygen to each reactor 12. The oxygen source can be supplied to air feed line 66 by any conventionally known supply source (not shown). An air feed branch line 68 having a valve 70 connects air feed line 66 with the associated air stream connector 26. Closure of valve 70 prevents air from passing into connector line 26.

The apparatus 10 also has oxygen donor solution holding tanks 72, 74 which contain solutions which provide additional inorganic oxygen for use in the catalytic decomposition of the chemical contaminants in water. As with water holding tank 12, the oxygen donor holding tanks 72, 74 can be constructed in any conventional manner and from conventional materials. Oxygen donor solution holding tanks 72, 74 are connected to donor solution supply pipes 76 and 78 having associated valves 80 and 82 and pumps 84 and 86. The oxygen donor solution supply lines convey the oxygen donor solutions contained in holding tanks 72, 74 to mainstream pipe 16 for mixture with the waste water stream.

Figure 2:
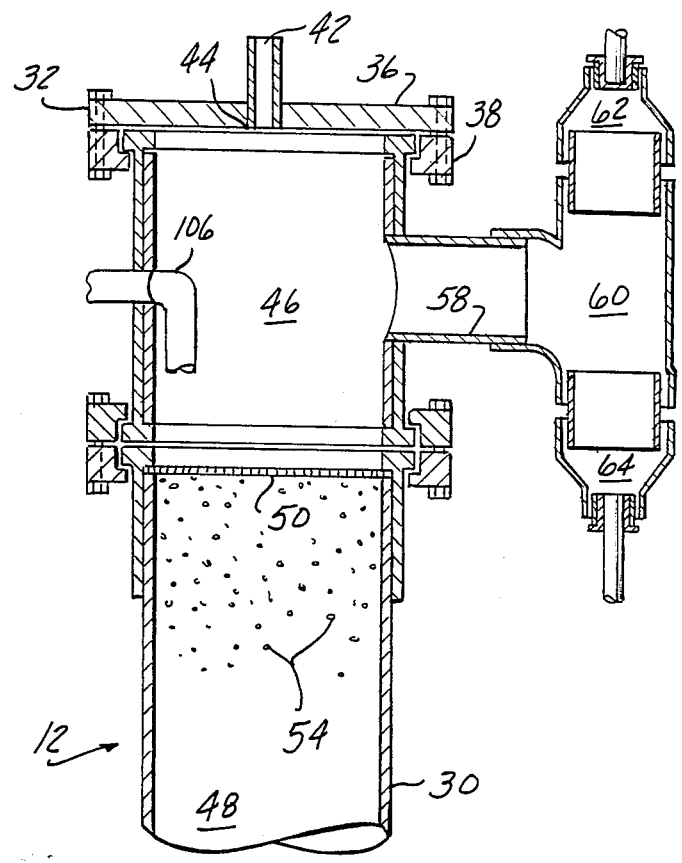
FIG. 2 is a cross-sectional view of one reactor employed in the present invention.
Figure 2:
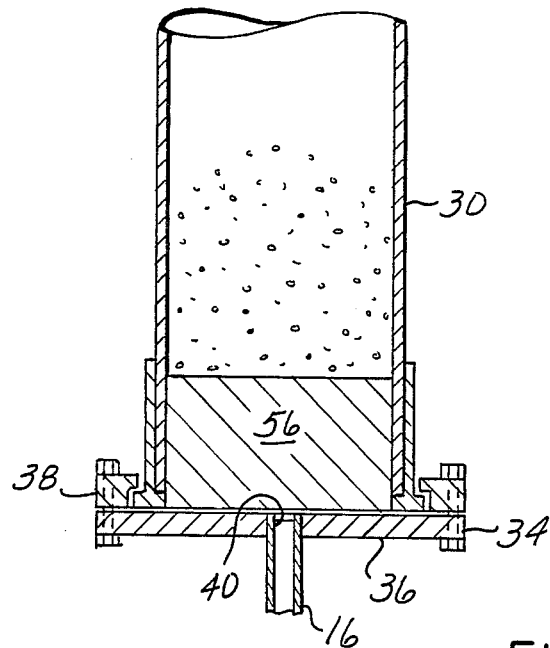

A reactor 12 of the present invention is shown in detail in FIG. 2. Each reactor 12 has a cylindrical housing 30 sealed at its upper and lower ends by an upper sealing means 32 and a lower sealing means 34. The sealing means 32 and 34 each include a plate 36 and a tension seal 38 which provides a watertight chamber. The mainstream pipe 16 is connected to an aperture 40 in the plate 36 located in the lower sealing means 34 to convey waste water into the reactor. An exhaust vent 42 is connected to an aperture 44 located in the plate 36 of upper sealing means 32.

The interior of the cylindrical housing 30 is divided into an upper recovery chamber 46 and a lower catalyst chamber 48. The catalyst chamber 48 contains the catalytic material which the process waste water contacts while being conveyed through the reactor. The recovery chamber 46 is an open chamber to eliminate any foaming which may have occurred as a result of catalytic reactions. The two chambers are separated by a screen 50 extending through the cross-section of the cylindrical housing 30. The screen 50 is held in place by a middle tension seal 52. The screen has a sufficiently fine mesh to confine the catalyst 54 in the catalyst chamber 48 but is sufficiently porous to permit the free flow of the process waste water stream.

The catalyst chamber 48 contains a bed of catalyst which is generally denoted as 54 in FIG. 2. The catalyst 54 may be activated alumina 54A or a metal catalyst 54B selected from the Group VIIIB or Group IB metals or mixtures thereof. In the preferred embodiment, each catalyst chamber 48 contains a single type of catalyst 54. However, when a single reactor 12 is used, the catalyst chamber 48 contains lower layers of catalyst 54A and upper layers of catalyst 54B.

In the preferred embodiment, at least two reactors 12 contain the activated alumina catalyst 54A. The activated alumina may be in any form which provides sufficient surface area for intimate contact between the catalyst and the process waste water, such as pellets or honeycomb monoliths containing approximately 70 percent alumina, 20 percent magnesia and 10 percent silica. The activated alumina catalyst 54A which can be employed in the process of the present invention is commercially available from several companies such as Duboco Inc. of Warren, Mich.; Alcoa of Pittsburgh, Pa.; or Adoca Corp. of Gardenia, Calif. In the preferred embodiment, pellets between about 0.5 mm and about 3.0 mm are used.

Use of activated alumina as an initial catalytic material is predicated on the discovery that activated alumina in the presence of oxygen-donor sources unexpectedly renders the resulting waste water more readily oxidized in catalytic reactions. Activated alumina also provides a relatively inexpensive and easily regenerated shield which protects subsequent metal catalyst 54B from excessive fouling and contamination by surface oils and other free organic materials which can render the catalyst inactive.

The apparatus of the present invention also contains metal catalyst 54B. This catalyst may be arranged in a single reactor 12 in layers immediately above the activated alumina catalyst 54A. However, in the preferred embodiment, the metal catalyst 54B is contained in at least one separate reactor 12' which is connected immediately downstream of reactors 12 which contain catalyst 54A.

The metal catalyst 54B is selected from the Group VIIIB and Group IB metals or mixtures thereof. Preferably, the catalyst 54B is selected from the group consisting of platinum, palladium, iridium, rhodium or mixtures thereof. It has been found that these metals provide an active catalytic surface for the decomposition of a broad range of chemical contaminants contained in the waste water stream.

In the preferred embodiment, the metal catalyst 54B is supported in a conventional manner by a suitable substrate, such as alumina, silica, silica-alumina or the like. About 0.5 to about 60 grams of catalyst 54B supported per cubic foot of substrate. The supported catalyst may be used in the form of pellets, cylindrical honeycomb monoliths, crushed fragments, particles or any other desired form which provides adequate surface area. In the preferred embodiment, pellets of the supported catalyst having diameters between about 1 mm and about 5 mm. In the preferred embodiment, pellets having 2 mm diameters are used. The supported catalyst can be prepared by several conventional methods. Suitable supported catalyst can also be commercially procured from W. R. Grace Co.

To prevent excessive abrasion of the catalytic surface, catalysts 54A, 54B and adsorptive material 54C are maintained in fixed beds in reactors 12, 12' etc.

The apparatus of the present invention has at least one reactor which contains a final adsorptive material 54C in the associated catalyst chamber 48. In the preferred embodiment four reactors 12" containing final adsorptive material 54C are provided, two of which are on-line during normal operation.

The adsorptive material employed may be any material which provides any desirable adsorptive surface for treatment and purification of the process waste water stream. The adsorptive material preferably employed is activated carbon and is used to provide a surface on which any residual chemical impurities which may remain in the water can adsorb. In the preferred embodiment, commercially available activated carbon pellets of about 1 to about 120 mesh are used. Activated carbon pellets suitable for use in the present invention are those with high surface area and porosity such as charcoal derived from coconut bark.

In order to maintain a fixed bed of catalysts 54A, 54B, and adsorptive material 54C the lower portion of each catalyst chamber 48 contains a compression member 56 which forces the catalyst 54 upward against the screen 50. The compression member may be a compressible, non-reactive polymeric foam such as polystyrene or a spring loaded diaphragm composed of any inert polymeric or metallic material capable of variable tension.

The recovery chamber 46 has an inlet opening in the cylindrical housing 30 to receive a regeneration branch line 106 for the introduction of regeneration fluid onto catalysts 54A and 54B. The regeneration process will be described in greater detail subsequently.

An optional means for separating gaseous and liquid phases after catalytic decomposition can be attached to each reactor 12. In the preferred embodiment, an exit pipe 58 is connected to the cylindrical housing 30 at the recovery chamber 46. The exit pipe 58 connects the associated recovery chamber 46 to a divider ventricle 60. The divider ventricle 60 has a gaseous phase collector dome 62 located above the junction of exit pipe 58 and divider ventricle 60 and an opposing lower liquid phase collector 64. The liquid phase collector 64 is connected to return line 88 which is connected to mainstream line 16 to convey process waste water to the next operating reactor 12 or to a discharge means (not shown).

The gaseous phase collector dome 62 is connected to a venting means (not shown) which can be opened or closed depending on the nature of the contaminants present.

During operation, process waste water and gas flows upward from the catalyst chamber 48 through screen 50 into the recovery chamber 46 where any foaming which may occur as a result of catalysis can subside. The water and gas stream flows through exit pipe 58 into divider ventricle 60. The liquid portion of the stream flows downward into return line 88. The gaseous portion generally rises through gaseous phase collector dome 62 and can be vented depending on the nature and amount of contaminants present.

The apparatus 10 of the present invention also has a means for isolating any combination of reactors 12, 12', 12" from the process stream for catalytic regeneration. The regeneration means comprises a pair of regenerating solution holding tanks 90, 92. A pair of connector lines 94, 96 having shut-off valves 98, 100, respectively, connect the regenerating solution holding tanks 90, 92 to regenerant line 102. Regenerant line 102 is equipped with at least one pump 104 to help convey a regenerant through line 102. The regenerant line 102 also has a valve 104 to divert the regenerant solution to the isolated reactor 12.

The apparatus 10 has a plurality of regenerant connector lines 106; each regenerant connector line 106 being associated with a given reactor 12. The regenerant connector line 106 is connected to an associated reactor 12 at its recovery chamber 46. The terminal portion of regenerant line 106 has an angular bend to direct a regenerant solution, conveyed through the line 106, downward through the recovery chamber 46 onto the upper portion of catalyst contained in catalyst chamber 48.

Mainstream connector line 26 is connected to reactor 12 and regenerant return line 108 which, in turn, is connected to holding tanks 90, 92. Regenerant return line 108 may have at least one pump 110 to convey the regenerant solution to regenerant holding tanks 90, 92.

A regenerant removal connector line 112 connects mainstream connector line 26 with regenerant removal line 114 which can be connected to mainstream holding tank 14. Regenerant return line 108 has a valve 116 which can be closed to divert the regenerant solution to the regenerant removal connector line 112. Similarly, the regenerant removal connector line 112 has a valve 118 which can be closed to divert the regenerant solution into line 108. Thus, regenerant removal line 114 and regenerant return line 108 provide alternate pathways for conveying regenerant fluid away from the reactor 12.

THE PROCESS

The process of the present invention involves the adsorption of chemical contaminants in process waste water in the presence of oxygen and a suitable catalyst and a method for regenerating contaminated catalyst in situ. In describing the process of the present invention, reference is again made to the apparatus 10 shown in FIGS. 1 and 2.

Process waste water is collected by conventional means and diverted to a mainstream holding tank 14. In many applications, primary flocculation treatment prior to introduction into the mainstream holding tank 14 of the present invention will be necessary to remove any insoluble components and prevent subsequent contamination of the catalysts used in the present invention. For example, industrial process waste water having oily contaminants can be suitably flocculated according to conventional methods and alum (aluminum sulfate) in the presence of various colloidal materials.

In the preferred embodiment, process waste water is admixed with an oxygen source in the presence of a catalyst 54A, 54B in a fixed bed. The water thus treated is then contacted by an adsorptive material 54C prior to discharge from the apparatus 10.

In the preferred embodiment, the process waste water is fed from mainstream holding tank 14 through a mainstream pipe 16 via mainstream connector line 26 to the bottom of a reactor 12 at a predetermined rate of flow. The flow rate may be varied by valve 18 and pump 20 or other conventional metering means to yield a contact time between about two and about thirty minutes, depending on the type, concentration and nature of the contaminants present. Longer contact times are possible by further varying the flow rate. Prolonged contact times are necessary when the COD levels in the process waste water stream is excessive, i.e., over 2,000 mg/l.

It is to be understood that the apparatus of the present invention has at least one reactor containing catalyst 54A and 54B, the catalysts being in fluid communication with each other. In the preferred embodiment, twelve reactors 12 are connected to each other and the mainstream holding tank 14 to permit the process waste water stream to pass sequentially through any combination of reactors 12. Certain reactors are charged with a catalyst 54A, 54B which promotes the oxidation of COD-producing chemicals in the presence of nacent and/or ionic oxygen. The remaining reactors are charged with adsorptive material 54C on which any unreacted contaminants can adsorb.

In the preferred embodiment, at least one initial on-line reactor and one standby reactor contain an activated alumina catalyst 54A. At least four on-line reactors and four stand-by reactors contain metal catalyst 54B.

Prior to or concurrently with the process waste water stream contacting the activated alumina catalyst 54A, the process waste water stream is mixed with an oxygen source conveyed through air feed line 66 shown in FIG. 1.

In the preferred embodiment, the oxygen source is an oxygen-containing gas, such as air, oxygen enriched air, oxygen or oxygen-containing waste gases. The feed rate of the oxygen source is determined from the theoretical amount of oxygen required for the oxidation of hydrocarbons present in the process waste water stream. In the preferred embodiment, the oxygen-containing gas is introduced at a pressure ranging from about 12 psi to about 112 psi into the waste water system immediately prior to entry into each individual reactor.

It has been observed that some chemical contaminants having molecular weights above about 470 are more rapidly oxidized than lower molecular weight compounds. This is particularly true where the hydrocarbon contaminant is highly unsaturated.

The catalyst 54A, 54B in each reactor catalyzes the oxidation of those hydrocarbons which are naturally highly susceptible to oxidation or rendered so by previous catalytic reactions. The high molecular weight hydrocarbons solubilize lower molecular weight compounds which, alone, would be insoluble or only slightly soluble in water. Partial or complete oxidation of the higher molecular weight compounds causes the lower molecular weight compounds to come out of solution and deposit on the catalyst as foulants, thereby reducing the efficiency of the catalytic surface. To prevent this, COD Eliminators A and B, acidic and alkaline oxygen donor solutions, respectively, are preferably admixed with the process waste water stream prior to entry into the first reactor 12. COD Eliminators A and B provide a source of oxygen having low volume dispersion to cope with high COD levels.

The acidic oxygen donor solution, COD Eliminator A (CODEL A) is conveyed from COD Eliminator A holding tank 72 through feed line 76 and is mixed with the process waste water stream. Similarly, the alkaline oxygen donor solution, COD Eliminator B (CODEL B), held in COD Eliminator B holding tank 74 is conveyed through feed line 78 and mixed with the process waste water stream. The three components, i.e., the oxygen source and the two oxygen donor solutions, may be fed into the waste water stream individually or simultaneously depending on the contamination level of the process stream. It is anticipated that waste water containing in excess of 2000 mg/l COD can be effectively treated using an oxygen source in combination with the oxygen donor solutions.

COD Eliminator A, the acidic oxygen donor solution, is a stabilized acidic composition manufactured by American Laboratories of Detroit, Mich., having available oxygen at levels of 10 percent or more of the total composition. COD Eliminator A comprises:

(a) inorganic acidic compound capable of dissociating to yield oxygen at a pH between about 2 and about 7;

(b) stabilizer compound consisting of tin or tin salts;

(c) an inorganic acid; and (d) water.

The inorganic acidic compound is selected from the group consisting of sodium perchlorate, lithium pechlorate, potassium perchlorate, hydrogen perchlorate, sodium pyrophosphate, lithium pyrophosphate, potassium sodium chlorate, lithium chlorate, pyrophosphate, hydrogen pyrophosphate, potassium chlorate, hydrogen chlorate, hydrogen persulfates, sodium persulfate, lithium persulfate, potassium persulfate, hydrogen peroxide, alkali peroxides, and mixtures thereof. The stabilizer is preferably a mixture of tin or tin salts. The preferred inorganic acid is sulfuric acid and is present in amounts sufficient to provide an acidic medium in which ionic and molecular oxygen, liberated when the oxygen donor component is added to water, are maintained in solution.

The acidic oxygen donor solution of the preferred embodiment contains:

(a) from about 0.05 to about 5.5 percent by weight inorganic acidic compound;

(b) from about 0.01 to about 10.0 percent by weight tin;

(c) from about 0.05 to about 5.5 percent by weight sulfuric acid; and (d) water to make up the balance of the solution.

The alkaline oxygen donor solution, COD Eliminator B, is a stabilized basic composition also manufactured by American Laboratories consisting essentially of water, stabilizers and an inorganic alkaline compound capable of dissociating to yield oxygen at a pH between 7 and about 13. The inorganic alkaline compound is selected from the group consisting essentially of alkali perborates, alkali permanganates and mixtures thereof which are generally stable in a basic media. The stabilizer is an alkali hydroxide such as sodium hydroxide, potassium hydroxide, lithium hydroxide and mixtures thereof.

The alkaline oxygen donor solution of the preferred embodiment contains:

(a) from about 0.05 to about 55.5 percent by weight inorganic alkaline compound;

(b) from about 0.01 to about 70.0 percent by weight alkali hydroxide; and (c) water comprising the balance of the solution.

In the preferred embodiment, COD Eliminators A and B are added to the process waste water stream to yield a waste water solution pH of about 7 to render high molecular weight hydrocarbons and low molecular weight hydrocarbons equally oxidizable. Careful adjustment of pH of the solution containing COD Eliminators A and B provides ionic oxygen which readily reacts with the chemical contaminants rendering them more easily oxidizable. By adding COD Eliminators A and B to the solution and maintaining the solution at a pH of about 7, low molecular weight contaminants will be oxidized immediately rather than becoming catalytic foulants when they come out of solution.

The process of chemical decomposition begins upon entry of the process waste water mixture into a reactor containing a fixed bed of activated alumina 54A or metal catalyst 54B thereby catalyzing the decomposition of certain chemical constituents to carbon dioxide, nitrogen and water. The reaction continues for as long a the process waste water stream remains in contact with the catalyst.

Depending on the type and nature of the resulting products, the process waste water stream may be vented upon exiting the particular reactor through the gaseous phase collector dome 62 and associated exit (not shown) to eliminate gaseous carbon dioxide and nitrogen which may have been produced during catalysis. If the decomposition products include volatile organic pollutants, the exit may remain closed and the volatile organics conveyed with the water to the next reactor 12. The waste water stream is then conveyed by return line 26 to mainstream pipe 66 and on to the next operating reactor 12.

Process waste water is mixed with additional amounts of oxygen source and oxygen donor solutions prior to entry into each subsequent reactor. The subsequent reactor may be a second reactor containing an activated alumina bed brought on-line to purify highly contaminated process water. Alternately, when process waste water contamination levels do not require treatment in a second bed containing activated alumina, the second reactor containing activated alumina may remain on standby and the process water is then brought into contact with a reactor containing metal catalyst selected from the Group VIIIB, Group IB metals or mixtures thereof for catalytic decomposition of the chemicals contained in the process waste water stream.

In the preferred embodiment, six reactors 12' containing the metal catalyst 54B are located immediately downstream of those reactors 12 containing activated alumina catalyst 54A. During normal operation, the process waste water stream is routed in series through at least one reactor containing metal catalyst 54B. As the process waste water stream exits each reactor containing metal catalyst 54B, the stream may be vented to permit reaction gasses, such as carbon dioxide or nitrogen to escape or remain unvented to encourage carryover of volatile organic contaminants to subsequent reactors until completely reacted in the manner described previously.

During normal operation, according to the method and apparatus of the present invention, three reactors containing the metal catalyst 54B are on-line at any given time. However, any number of reactors 12 containing metal catalyst 54B can be brought on-line to assure complete oxidation of the chemical contaminants in the process waste water. This permits the operator great flexibility to assure efficient COD reduction in highly contaminated process waste water.

After the process waste water stream exits the final reactor containing a metal catalyst 54B, it may be conveyed in the manner described previously through at least one final reactor containing adsorptive material 54C. In the preferred embodiment, adsorptive material 54C is maintained in a fixed bed in the manner described previously. Additional reactors containing adsorptive material 54C serve as standby units. In the preferred embodiment, four such reactors are provided, two of which are on-line during normal operation.

It has been found that, in addition to the adsorptive properties, activated carbon, the preferred adsorptive material 54C, will catalyze partial oxidation of certain chemicals which may remain in the process waste water, if an oxygen donor solution such as COD Eliminator A or COD Eliminator B is also present.

After treatment as outlined in the present invention, the purified water may be recycled for industrial use or dispatched for subsequent conventional post-treatment processing prior to release as plant effluent. Such treatment may include treatment to remove salts or metals, adjust pH, etc., as required.

REGENERATION

It has been found that a decline in catalytic activity is due, largely, to the introduction of foulants which coat the surface of the catalyst 54A, 54B and prevent the catalyst from interacting with the oxygen and the chemicals contained in the process waste water stream. The majority of foulants are either insoluble organic compounds or inorganic precipitates. In the past, decline in catalytic activity necessitated replacing the costly catalyst with a fresh supply at frequent intervals because catalytic regeneration required complex procedures normally unavailable to the average plant. The present invention provides a means in which catalyst 54A, 54B can be regenerated in situ with the respective reactors.

In order to remove insoluble organic compounds deposited on the surface of the catalyst 54A, 54B, a highly alkaline solution is washed over the catalyst from top to bottom to provide a total contact time between about 5 and about 30 minutes. In order to eliminate any COD which may be contributed by the regeneration solution, the solution is comprised entirely of inorganic components. The alkaline regeneration solution employed in the present invention contains an alkali hydroxide, an alkali perborate, borax, and a component selected from the group consisting of an alkali silicate, alkali metasilicate, alkali carbonate or alkali polyphosphate and water. More specifically, the alkali hydroxide, alkali perborate, alkali metasilicate, alkali carbonate and alkali polyphosphate are present as either the sodium, lithium or potassium compounds.

The alkaline regeneration solution can be used in its concentrated form or can be diluted to a concentration up to and including one part regeneration solution in nine parts water.

In the preferred embodiment, the regeneration solution contains the following components:

(a) from about 1 to about 25 percent by weight potassium hydroxide;

(b) from about 2 to about 15 percent by weight sodium perborate;

(c) from about 2 to about 15 percent by weight borax;

(d) from about 2 to about 15 percent by weight sodium silicate; and (e) from about 90 to about 30 percent by weight water.

When the regeneration fluid is used in its concentrated form, the alkaline regeneration wash is ordinarily followed by a post-regeneration step in which the catalyst is rinsed with clear water for an interval of about 30 seconds to about 10 minutes to remove any remaining regeneration solution. When the regeneration solution is diluted, the post-regeneration rinse can be shortened or eliminated.

Inorganic foulants deposited on catalyst 54A, 54B include various metal salts and other compounds which precipitate on to the surface of the catalyst. In order to remove insoluble inorganic compounds adhering to the catalytic surface, the catalyst 54A, 54B, is washed with an acidic regeneration fluid to yield a contact time between about 5 and about 30 minutes. The acidic regeneration fluid is an aqueous solution acidified with a suitable inorganic acid to yield a pH in the range between 2 and 5. In the preferred embodiment, the solution contains between about 2 and about 20 percent by volume, inorganic acid and water.

Where the acidic regeneration solution contains about 20 volume percent acid, the catalyst is subsequently washed with clean water to remove any acidic regeneration solution remaining in the bed. When the acid concentration in solution is more dilute, the post-acidic regeneration rinse can be shortened or eliminated.

The acidic regeneration solution functions to dissolve inorganic material such as calcium carbonate and magnesium carbonate deposited on the catalyst. Any acid may be employed which does not contribute to the formation of precipitates with metal cations such as magnesium, iron, calcium and the like. In the preferred embodiment, the hydrochloric acid is used.

The frequency with which a given catalyst 54A, 54B is regenerated with the regeneration solutions depends upon the amount and type of foulants deposited on that catalyst during operation. It is anticipated that during normal operation, the amount of organic foulants deposited on the catalyst will exceed the inorganic contaminants deposited. Thus, alkaline regeneration will occur more frequently. Alkaline regeneration can be done alone or prior to acidic regeneration depending on the foulants present on the catalytic surface. However, for maximum efficiency, acidic regeneration should occur immediately after an alkaline regeneration cycle. When the alkaline regeneration cycle is followed immediately by an acidic regeneration cycle, the post-alkaline regeneration rinse may be eliminated.

The adsorptive material 54C may also be regenerated according to the methods outlined above.

According to the method and apparatus of the present invention, regeneration can be carried on in any number of reactors while the apparatus 20 continues to operate. In order to effect regeneration of catalyst 54A, 54B or adsorptive material 54C contained within a given reactor, that reactor is isolated from the air feed line 66 and mainstream pipe 16. Valve 21 located in mainstream connector pipe, normally open during catalytic operation, is closed and valve 22 is opened to divert the process waste water to the next operating reactor. The oxygen source such as compressed air is rerouted away from the reactor to be regenerated by closing air valve 70.

Regeneration fluids are conveyed from either regeneration tank 90 or 92 through main regeneration line 102 to the appropriate regeneration branch line 106. When the regeneration branch line valve 105 located in line 106 is opened, a portion of the regeneration fluid is conveyed out of the main regeneration line 102 into the regeneration branch line 106. The regeneration branch line 106 is connected to the reactor at a position opposed to the mainstream connector pipe 26.

When a catalyst 54A, 54B or adsorptive material 54C is to be regenerated, valve 21 located in mainstream connector pipe 26 is closed. The regeneration fluid backwashes the catalyst 54A, 54B or adsorptive material 54C and exits the reactor through the mainstream connector pipe 26. A regeneration return line 108 is connected to the mainstream connector pipe 26 at a location between valve 21 and reactor. Regeneration return line 108 conveys the regeneration fluid back to the regeneration fluid tanks 90 or 92.

Rinse water can be conveyed to the apparatus 10 for various sources (not shown) through a water pipe 120 which connects and extends to all reactors 12. When a particular reactor is to be rinsed after regeneration, a valve 122 located immediately downstream of the junction between city water pipeline 120 and water connector line 124 is closed to divert the water from the main water pipeline 120. The rinse water exits the reactor through the mainstream connector pipe 24 and is diverted into a return line 114 to the mainstream holding tank 14 where it can be purified by the present process prior to disposal.

In the preferred embodiment, it is anticipated that regeneration will be an ongoing process. As regeneration of the catalyst 54A, 54B or adsorptive material 54C contained in an associated reactor is completed, that reactor can be brought back into service and another for regeneration. It is also anticipated that the catalyst 54A, 54B or adsorptive material 54C contained in several reactors can be regenerated at one time.

In the preferred embodiment, it is anticipated that a plurality of reactors will be in operation at a given time.

Thus, what has been disclosed is an apparatus and method for reducing chemical oxygen demand in water using multiple catalytic beds containing different catalysts capable of eliminating chemicals which contribute to COD in which reactors containing the various catalysts can be isolated and regenerated in situ. The entire process can be carried on at standard temperature and pressure.

For a more complete understanding of the present invention, reference is made to the following examples. The examples are to be construed as illustrative and not limitative of the present invention.

EXAMPLE I

A representative sample of approximately 8 liters of process waste water which had been subject to conventional primary treatment and having a resultant COD of 880 mg/L was treated according to the method previously set forth. Process waste water was contacted with an activated alumina catalyst 2 mm pellets, platinum catalyst on a substrate of 2 mm activated alumina pellets and activated carbon, sequentially, at a flow rate of 55 ml/min. for a total retention time of five minutes. Compressed air was employed as the oxygen source and was introduced at a rate of 0.05 cubic feet per hour. Samples of the treated water were taken at the increments specified in Table I. The COD level of each sample was determined according to EPA Standard Method 507 entitled "Biochemical Oxygen Demand" set forth in *EPA Standard Methods, The 15 Edition* (198), published by the American Waterworks Association, which is incorporated by reference herein. The results are set forth in Table I.

TABLE I

Treatment of process waste water having initial COD leel of 880 mg/L at flow rate of 55 ml/min.

| Sample | Amount Treated (ml) | COD Level (mg/L) |
| --- | --- | --- |
| A | 1400 | 80 |
| B | 2800 | 80 |
| C | 4000 | 140 |
| D | 6000 | 200 |
| E | 7000 | 205 |
| F | 8000 | 225 |
| G | 9100 | 110 |
| H | 10200 | 160 |
| I | 11300 | 190 |
| J | 12400 | 225 |
| K | 13500 | 240 |
| L | 14600 | 260 |
| M | 15700 | 270 |
| N | 16800 | 290 |
| O | 17900 | 300 |
| P | 19000 | 325 |
| Q | 20100 | 340 |
| R | 21200 | 345 |
| S | 22300 | 340 |
| T | 23400 | 340 |
| U | 24500 | 365 |
| V | 25600 | 380 |

As can be seen from Table I, process waste water treated according to the method of the present invention showed a dramatic decrease in its COD content. Even after treatment of 25.6 L (equivalent to an operating time of approximately 7¾ hour) the total COD content was reduced to 50 percent of the initial sample. The COD level of the final sample was well below the Federally mandated level of 600 mg/L COD for process effluent.

Having thus disclosed the present invention, what is claimed is:

1. An apparatus for reducing chemical oxygen demand (COD) levels in water comprising:
    a waste water holding tank;
    a plurlaity of independent, individually isolatable reactors;
    catalyst contained in a fixed bed within each reactor, the catalyst, selected from the group consisting of activated alumina, Group VIIIB metals, Group IIB metals, and mixtures thereof;
    means for conveying the water from the waste water hodling tank to the respective reactor;
    means for conveying at least one oxygen source to the water;
    means for discharging water away from each reactor;
    means for discharging water from the apparatus; and
    means for regenerating the spent catalyst while the catalyst remains contained within each respective reactor, the regenerating means associated with each respective reactor.

2. The apparatus of claim 1 wherein each reactor comprises:
- a cylindrical housing having a catalyst chamber in which the catalyst is fixedly contained, a recovery chamber positioned above and in fluid communication with the catalyst chamber and a central screen located between the catalyst chamber and recovery chamber;
- a water inlet pipe in contact with the catalyst chamber; and
- an exit pipe having first and second ends, the first end connected to the cylindrical housing in contact with the recovery chamber.

3. The apparatus of claim 2 wherein each reactor further comprises means for compressing the catalyst against the central screen.

4. The apparatus of claim 3 wherein the compression means is a polymeric foam positioned within the catalyst chamber opposed to the central screen.

5. The apparatus of claim 2 wherein the reactor further comprises a divider ventricle in communication with the second end of the exit pipe, the divider ventricle having:
- a gaseous collector dome located above the junction between the exit pipe and divider ventricle;
- a gaseous escape vent located in the gaseous collector dome;
- a liquid phase collector portion opposed to the gaseous collector dome having a liquid exit water return passage.

6. The apparatus of claim 1 wherein the means for conveying water from the waste water holding tank to the reactors comprises:
- a main water pipe;
- a first shut-off valve located in the main water pipe adjacent to the holding tank;
- a plurality of main water pipe branch lines connected at a first end to the main water pipe and at a second end to the base of one of the reactors;
- a plurality of first diverter valves in the main water pipe, each first diverter valve located immediately down stream of an associated main water pipe branch line, the first diverter valve positioned in the closed position to route the water into the main water pipe branch pipe line; and
- a plurality of second diverter valves, one diverter valve located in an associated main water pipe branch line to control entry of water into a given reactor.

7. The apparatus of claim 6 wherein the means for discharging water away from each reactor comprises:
- an exit pipe affixed to and extending outward from the reactor;
- a divider ventricle attached to the exit pipe; and
- a return line attached to the divider ventricle and connected to the main water pipe line.

8. The apparatus of claim 6 wherein the means for conveying an oxygen source to the water comprises:
- a plurality of air feed lines, each air feed line connected to an associated main water branch feed line.

9. The apparatus of claim 6 wherein the means for conveying an oxygen source to the water comprises:
- a holding tank containing a stabilized aqueous acidic oxygen donor solution containing an acidic compound selected from the group consisting of sodium perchlorate, lithium perchlorate, potassium perchlorate, hydrogen perchlorate, sodium pyrophosphate, lithium pyrophosphate, potassium sodium chlorate, lithium chlorate, hydrogen pyrophosphate, potassium chlorate, hydrogen chlorate, hydrogen persulfate, hydrogen peroxide, alkali metal peroxides and mixtures thereof; and
- conduits for conveying the stabilized aqueous acidic oxygen donor solution to the waste water stream, the conduits in fluid communication with the oxygen source holding tank at a first end and connected to an associated main water pipe branch line at a second end.

10. The apparatus of claim 6 wherein the means for conveying an oxygen source to the water comprises:
- a holding tank containing a stabilized alkaline aqueous donor solution containing an alkaline compound selected from the group consisting of alkali perborates, alkali permanganates and mixtures thereof; and
- conduits for conveying the stabilized alkaline aqueous donor solution to the waste water stream, the conduits in fluid communication with the oxygen source holding tank at a first end and connected to an associated main water pipe branch line at a second end.

11. The apparatus of claim 1 wherein the plurality of independent individually isolatable reactors comprises:
- a first group of reactors, at least one such reactor containing an activated alumina catalyst;
- a second group of reactors downstream of an in fluid communication with the first group of reactors, at least one such reactor in the second group containing a catalyst selected from the group consisting of Group VIIIB metals, Group IIB metals or mixtures thereof.

12. The apparatus of claim 11 wherein the catalyst contained in the second group of reactors is selected from the group consisting of platinum, palladium iridium, rhodium or mixtures thereof.

13. The apparatus of claim 11 further comprising:
- a third group of reactors downstream of and in fluid communication with the second group of reactors, at least one such reactor in the third group containing an adsorptive material.

14. The apparatus of claim 13 wherein the adsorptive material is activated carbon.

15. The apparatus of claim 1 wherein the catalyst is supported on a substrate selected from the group consisting of alumina, silica or mixtures thereof and is maintained in a fixed bed within the respective reactor.

16. The apparatus of claim 15 wherein the supported catalyst is present as pellets having a diameter between about 1 mm and about 5 mm.

17. The apparatus of claim 1 wherein the regenerating means comprises:
- means for isolating selected reactors from the waste water;
- an alkaline regeneration solution holding tank;
- means for conveying the alkaline regeneration solution to the selected reactors;
- an acidic regeneration solution holding tank;
- means for conveying acidic regeneration solution to the selected reactors; and
- means for recycling the respective regenerant solutions.

18. An apparatus for reducing levels of chemical contaminants in aqueous media comprising:
- a holding tank for the aqueous media;

a plurality of independent, individually isolatable reactors capable of being in fluid communication with one another;

catalyst fixedly contained within each reactor, the catalyst selected from the group consisting of activated alumina, Group VIIIB metals, Group IIB metals and mixtures thereof;

means for conveying the aqueous media from the hodling tank to the reactor, the conveying means comprising:
(a) a main water pipe; and
(b) a plurality of main water pipe branch lines connected at a first end to the main water pipe and at a second end to the base of the associated reactor;

means for conveying at least one oxygen source to the aqueous media;

means for discharging the aqueous media from the reactor, the discharge means comprising:
(a) an exit pipe, having a first end affixed to and extending outward from the associated reactor;
(b) a divider ventricle in communication with a second end of the exit pipe, the divider ventricle having a gaseous collector dome above the junction with the exit pipe with a gaseous escape vent located therein and a liquid phase collector portion; and
(c) a return line connected to the liquid phase collector portion at a first end and connected to the main water pipe at a second end; and means for discharging the aqueous media from the apparatus.

19. The apparatus of claim 18 wherein the plurality of independent individually isolatable reactors comprise:
a first group of reactors in fluid communication with the main water pipe at an initial upstream point thereon, at least one reactor containing activated alumina catalyst;
a second group of reactors in fluid communication with the main water pipe located downstream of the first group of reactors, at least one such reactor in the second group containing catalyst selected from the group consisting of Group VIIIB metals, Group IIB metals or mixtures thereof.

20. The apparatus of claim 19 wherein the catalyst contained in the second group of reactors is selected from the group consisting of platinum, palladium, iridium, rhodium, and mixtures thereof.

21. The apparatus of claim 18 further comprising:
a third group of reactors in fluid communication with the main water pipe located downstream of the second group of reactors, at least one such reactor in the third group containing an activated carbon adsorptive material

* * * * *